Sept. 24, 1929.   A. J. CROWLEY   1,729,246
METHOD FOR EXTRACTING SULPHUR
Filed July 6, 1927
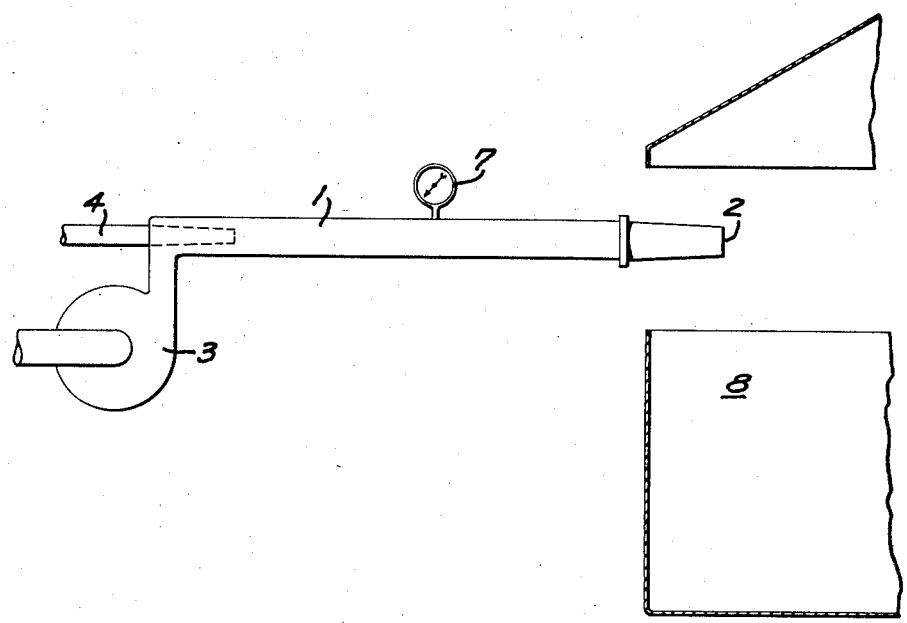
INVENTOR
ARTHUR J. CROWLEY.
BY Charles S. Evans
HIS ATTORNEY.

Patented Sept. 24, 1929

1,729,246

UNITED STATES PATENT OFFICE

ARTHUR J. CROWLEY, OF SULPHUR, NEVADA, ASSIGNOR TO HUMBOLDT SULPHUR COMPANY, OF SULPHUR, NEVADA, A CORPORATION OF DELAWARE

METHOD FOR EXTRACTING SULPHUR

Application filed July 6, 1927. Serial No. 203,795.

My invention relates to a method and apparatus for extracting sulphur concentrates from a sulphur containing material, such as sulphur ore, in which the sulphur is mechanically enclosed, and the broad object of my invention is to extract the sulphur from the sulphur containing material by means of a liquid heated to a high temperature.

Another object of the invention is to extract the sulphur by a continuous process.

Another object of the invention is to produce a concentrate in which the sulphur exists in a finely divided condition.

Another object of the invention is to extract the sulphur in a molten condition and then spray the molten sulphur and the residue thru a restricted passage into the atmosphere to finely divide and solidify the sulphur.

Other objects of the invention together with the foregoing will be set forth in the following description of my preferred embodiment of means for practicing my invention and which is illustrated in the drawings accompanying and forming part of the specification. It is to be understood that I do not limit myself to the showing made by the said description and drawings, as I may adopt variations of my preferred form within the scope of my invention as set forth in the claims.

Referring to the drawings:

The figure is a diagrammatic elevational view of the apparatus for carrying out my invention.

In terms of broad inclusion, my sulphur extractor comprises an elongated tube which is open at one end to permit the introduction of a mixture of sulphur ore and water into the passage of the tube, while the opposite end thereof tapers to form a restricted passage, or has a nozzle thereon. By means of a pump or any other method such as a gravity method, a mixture of sulphur containing material such as sulphur ore and water is continuously forced thru the passage. Steam is admitted into the passage at a pressure of about 50 lbs. per square inch in order to superheat the water to a temperature in excess of 235° F. and the superheated water extracts molten sulphur from the material. As the molten sulphur collects it is forced along the passage together with the residue and then thru a restricted passage or nozzle at the other end of the passage.

Upon discharge into the atmosphere, and due to the sudden release of the pressure, the sulphur is expanded, causing it to break up into finely divided particles of about 60 mesh, and at the same time cool and solidify. The residue, together with sulphur, is also forced out thru the nozzle.

A collecting tank is placed adjacent the nozzle and the sulphur and residue collected therein is then screened thru a 60 mesh screen or subjected to classification, by means of a classifier, such as a "Dorr" classifier. Since most of the particles of residue are much larger than those of the sulphur, only the fine particles of residue will remain in the sulphur after screening or classification. The concentrate thus collected may be stored and treated for purification in a manner covered by application No. 203,792 for Letters Patent.

In detail, my apparatus comprises a tube 1, preferably made of wrought iron, about 2 inches in diameter and 8 feet long, with an open end 2, thru which a mixture of sulphur containing material, such as sulphur ore, and water is forced, by means of a pump 3. A steam inlet 4 projects thru the open end 2 of the passage, while the opposite end thereof has a nozzle 6 thereon. A pressure gauge 7 indicates the pressure within the passage, while tank 8 adjacent the nozzle affords a convenient means for collecting the sulphur concentrate.

I claim:

1. A process of extracting sulphur which comprises passing superheated water thru a mass of sulphur containing material to melt the sulphur therefrom, and forcing the molten sulphur and residue thru a restricted passage to solidify and divide the sulphur.

2. A process of extracting sulphur which comprises passing superheated water thru a mass of sulphur containing material to melt the sulphur therefrom and forcing the molten sulphur and residue thru a restricted passage into the atmosphere to solidify and divide the sulphur.

3. A process of extracting sulphur which comprises passing superheated water thru a mass of sulphur containing material to melt the sulphur therefrom and forcing the molten sulphur and residue thru a nozzle into the atmosphere to solidify and divide the sulphur.

4. A continuous process of extracting sulphur which comprises forcing sulphur containing material and water thru one end of a passage; introducing steam for superheating the water to melt the sulphur from the material; and forcing the molten sulphur and residue thru the passage and thru a restricted portion thereof to solidify and divide the sulphur.

5. A continuous process of extracting sulphur which comprises forcing sulphur containing material and water thru one end of a passage; introducing steam for superheating the water to melt the sulphur from the material; and forcing the molten sulphur and residue thru the passage and thru a restricted portion at the opposite end thereof to solidify and divide the sulphur.

6. A continuous process of extracting sulphur which comprises forcing sulphur containing material and water thru one end of a passage; introducing steam for superheating the water to melt the sulphur from the material; and forcing the molten sulphur and residue thru the passage and thru a nozzle, at the opposite end thereof, into the atmosphere, to solidify and divide the sulphur.

In testimony whereof, I have hereunto set my hand.

ARTHUR J. CROWLEY.